United States Patent Office 3,823,068
Patented July 9, 1974

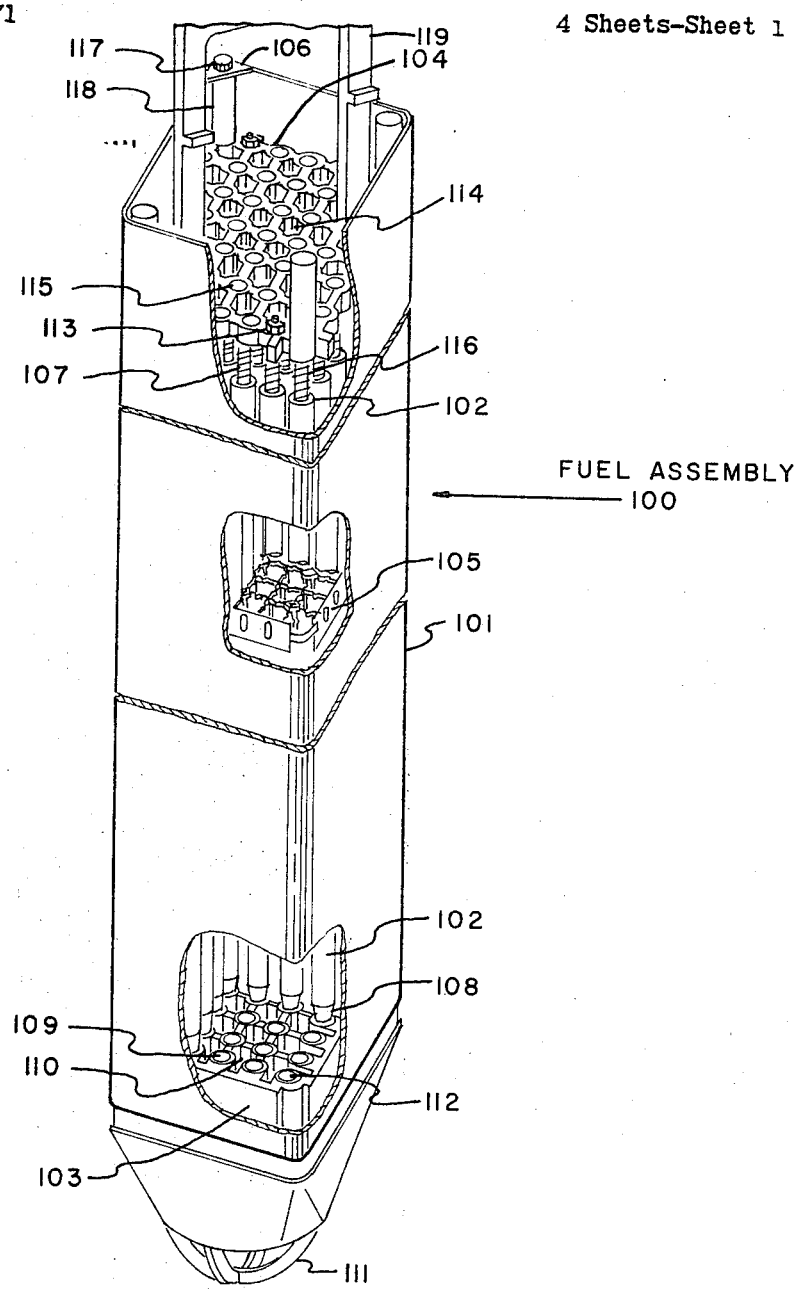
FIGURE I

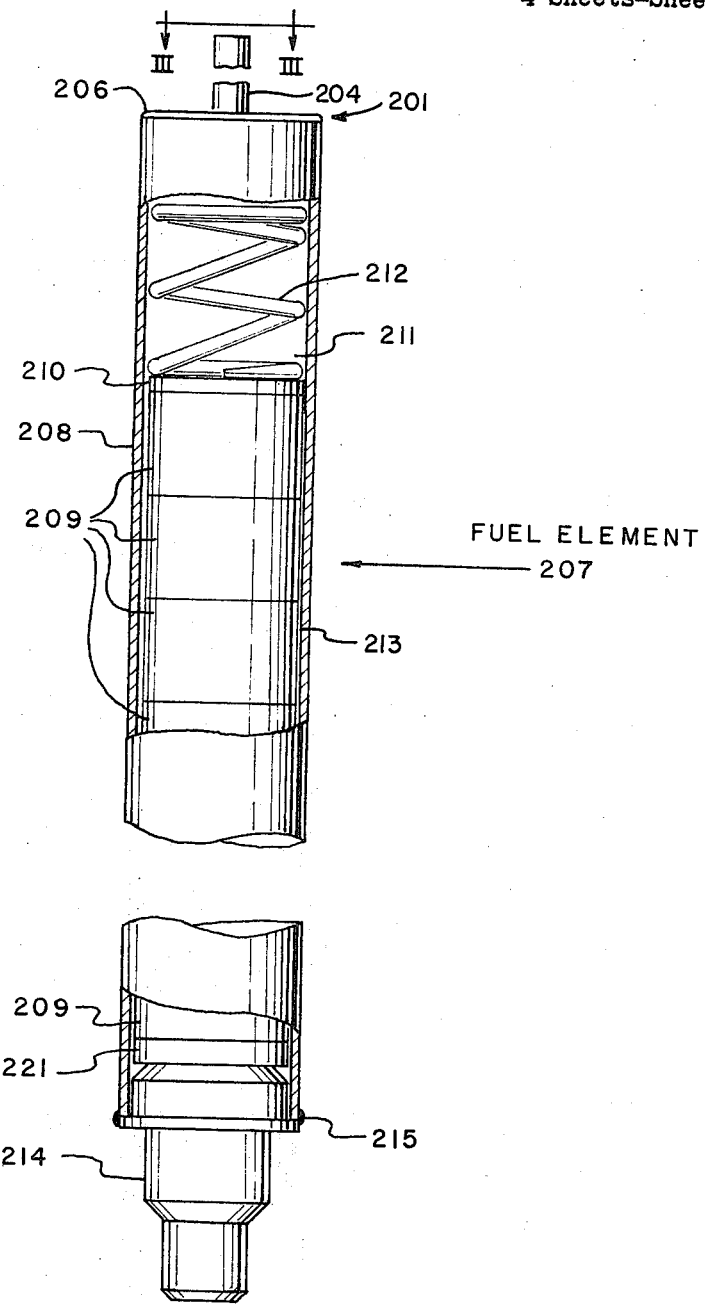
FIGURE II

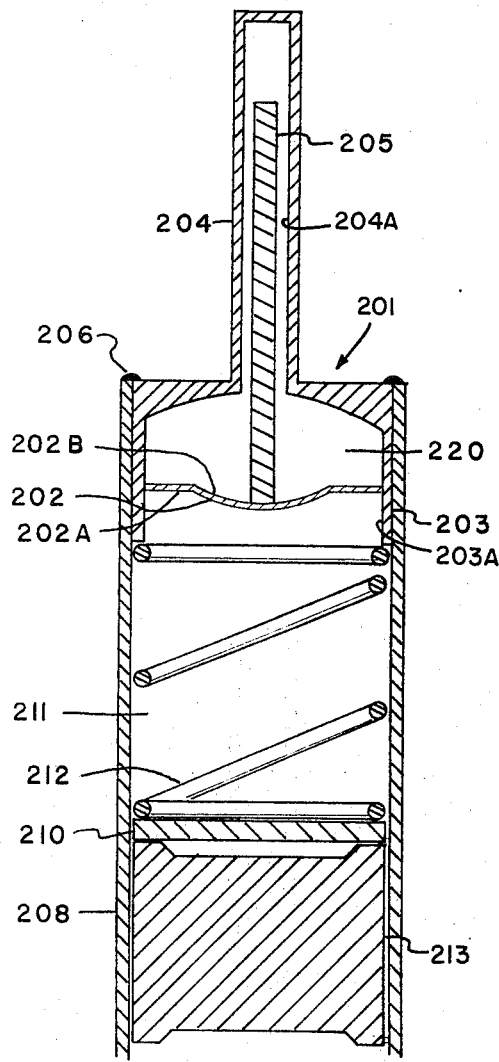
FIGURE III A
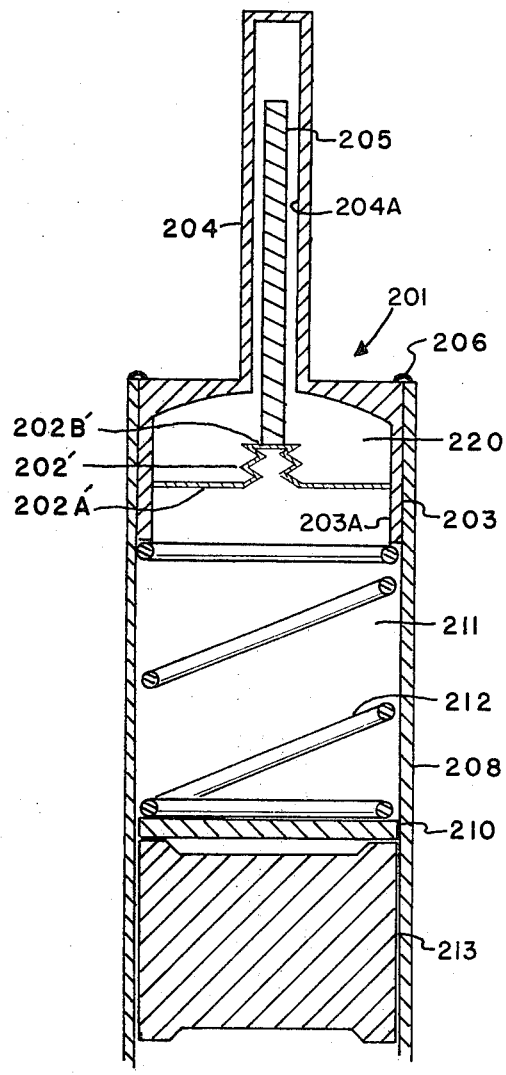
FIGURE III B

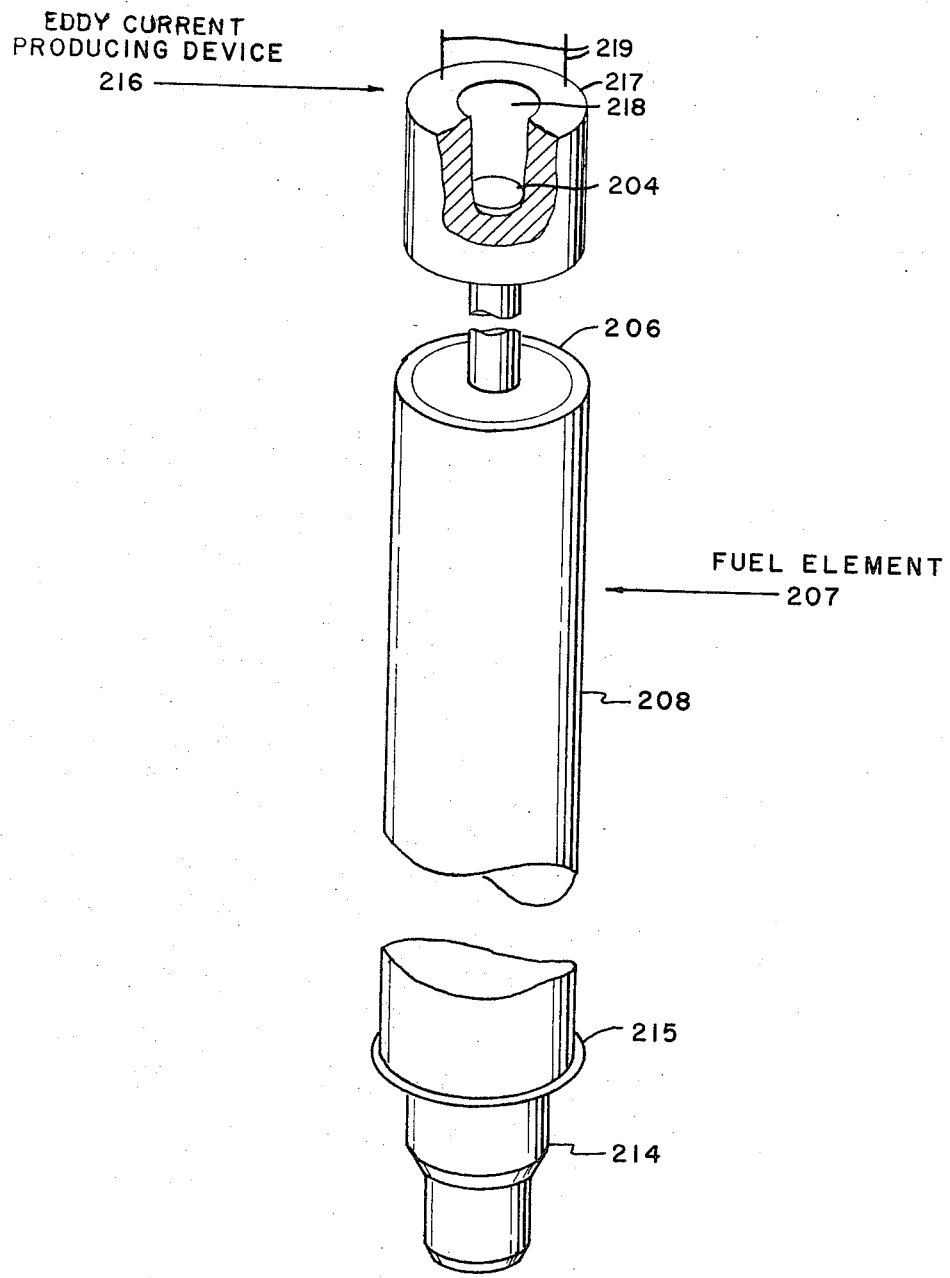

3,823,068
FUEL ELEMENT END CAP FOR
LEAK DETECTION
Dan C. Worlton and Joseph Ryden, Jr., Richland, Wash.,
assignors to Jersey Nuclear Company, Bellevue, Wash.
Filed Nov. 22, 1971, Ser. No. 200,698
Int. Cl. G21c 3/03, 3/10, 17/00
U.S. Cl. 176—80                                    13 Claims

ABSTRACT OF THE DISCLOSURE

Nuclear reactor fuel element leakage can now be determined without removing the fuel elements from the reactor core by employing an upper fuel element end cap having a flexible means which is sensitive to pressure changes within the fuel element and which activates an eddy current effecting means, and by placing an eddy current near the end cap.

BACKGROUND OF THE INVENTION

This invention relates to nuclear reactions and systems and in more particular to a method and apparatus for determining if there is leakage from a nuclear reactor fuel element.

One problem faced in the utilization of nuclear power as an energy source is the radioactive contamination of the reactor facility. One source of such contamination is leakage of fission product gases and other radioactive materials from a fuel element during reactor operation. These contaminants then enter the coolant material and are carried to other areas in the reactor facility.

In order to minimize this leakage the fuel elements in the reactor are periodically examined for leaks. The present practice is to physically remove the fuel elements from the reactor core and to examine them by ultrasonic or radiographic methods. However, such procedures not only require the use of expensive and complex equipment to disassemble and remove the fuel elements from the core for examination, but also the reactor must be shut down or run at reduced power levels for long periods of time.

Attempts have been made, as exemplified in U.S. Pats. 3,296,864, 3,230,771 and 3,350,271, to reduce and overcome the disadvantages of the standard practice by devising various methods for rapidly testing the fuel elements for leakage without having to remove them from the reactor core. These methods have not been acceptable because either measurements could not accurately determine the leakage or the apparatus could not function in the reactor environment, as well as, for other reasons.

SUMMARY OF THE INVENTION

It is therefore an object of this invention to provide a method and apparatus for determining fuel element leakage without the necessity for removing the fuel elements from the reactor core.

A further object is to provide a method and apparatus for rapidly determining fuel element leakage.

These and other objects and advantages of this invention will become obvious upon an examination of the subsequent descriptions and illustrations of the invention.

Accordingly, it has been found that fuel element leakage can be rapidly determined without removing the fuel element from the reactor core by accurately measuring the internal fuel element gas pressure produced by the fission product gases released during reactor operation. This gas pressure is determined by measuring the fluctuations in an eddy current produced by the specially designed fuel element end cap when the eddy current is placed near it.

This end cap comprises a structural body having a cavity which opens up to the hollow portion of the fuel element, a flexible means which seals the cavity opening from the hollow portion of the fuel element and will undergo movement into the cavity when pressure from within the fuel element is exerted against it, and a projecting means located within the cavity and contacting the flexible means at a position where the projecting means also undergoes movement caused by the fuel element pressure.

In a preferred embodiment of the invention the flexible means will be a diaphragm or bellows assembly. In this embodiment the projecting means can be a rod constructed at least in part of ferromagnetic material. One end of the rod will rest on the diaphragm or bellows assembly at a position that will cause the rod to rise up toward the top of the structural body when the diaphragm or bellows assembly moves upward. In a more preferred embodiment the structural body will have the shape of a normal fuel element upper end cap. The cavity will extend into the neck of the end cap and will be shaped so as to act as a guide for the rod.

In an alternate embodiment of this invention the flexible means may be attached to the fuel element so as to seal off the end cap cavity from the fuel containing portion of the fuel element.

With the end cap of this invention fuel element leakage is determined by the following steps: the power output is lowered around the fuel element to be tested, an eddy current is placed around the end cap, measurements are then made of the change in the eddy current from some standard measurement. From this change, or lack of change, it can be determined if the fuel element is leaking.

In a preferred embodiment the power output will be lowered for about thirty minutes or more to allow any gas trapped in the fuel element to leak out of any openings that may be in the fuel element.

In one embodiment a measurement is made of the eddy current when no pressure is within the fuel element. This measurement is used as the standard measurement. Thus a change from the standard measurement will indicate pressure within the fuel element, i.e., no leakage.

BRIEF DESCRIPTION OF THE DRAWINGS

FIG. I is an isometric view, partly in section, of a fuel subassembly which incorporates the fuel elements of the present invention.

FIG. II is a side elevation view, partly in section, of a typical fuel element in relationship with a modified end cap of this invention.

FIG. III–A is a cross-sectional view of an end cap design of this invention which utilizes a diaphragm assembly taken along lines III—III as shown in FIG. II.

FIG. III–B is a cross-sectional view of an end cap design of this invention which utilizes a bellows assembly taken along lines III—III as shown in FIG. II.

FIG. IV is an exploded illustration showing one method of cooperation between an upper end cap design of this invention and a preferred eddy current producing means.

PREFERRED EMBODIMENTS OF THE INVENTION

While the apparatus and methods described in this invention can be utilized in detecting leakage in any closed vessel or system, they are especially adapted for use in detecting leakage in a nuclear reactor fuel element and for illustrative purposes their use will be described in such a fuel element.

In FIG. I a typical fuel assembly is shown which incorporates fuel elements having the upper end caps of this invention. Fuel assembly 100 generally consists of open ended tubular channel 101, fuel elements 102, lower tie plate 103, upper plate 104, and fuel element spacer devices 105. Tubular channel 101 has a square cross section with the upper end having corner members 106 which support the channel after it has been inserted over the fuel elements. Fuel elements 102 are inserted into and are supported in spaced relation by a plurality of fuel element spacer devices 105 which rest against the interior surface of tubular channel 101. These fuel element spacer devices are separated from one another at a predetermined distance along the bundle, for example, one and one-half feet, and are connected to one or more of the fuel elements to prevent longitudinal movement of the spacer devices.

Each fuel element 102 comprises an elongated tube or cladding which may be made from many different materials; however, it is preferably made of an alloy of zirconium such as is marketed under the trade name "Zircaloy," since this material has a low neutron capture cross section. The upper end of the fuel elements are sealed by means of the upper end caps 107 of this invention and the lower ends of the fuel elements sealed by lower end caps 108.

The lower ends of the fuel elements are supported by lower tie plate 103 and register with support cavities 109 which are formed through the tie plate. Openings 110 are positioned adjacent to cavities 109 and communicate directly with lower opening 111. The upper end of the tie plate has a square cross section for receiving the lower end of tubular channel 101. When the fuel assembly is mounted in the reactor, lower opening 111 communicates with a supply plenum containing a source of coolant such as water. Several support cavities denoted by reference numeral 112, are threaded and receive fuel elements having threaded ends.

Upper tie plate 104 is secured to these same threaded fuel elements by nuts, such as those denoted by reference numeral 113, registering with threaded upper extensions thereof. Openings 114 are provided in upper tie plate 104 to communicate the interior of the fuel assembly with the discharge plenum of the reactor. Fuel element support cavities 115 are formed through the upper tie plate. These cavities receive the upper ends of the fuel elements and have sufficient depth to permit their longitudinal expansion. Compression springs 116 are provided to maintain a load, which is determined by the torque applied to nuts 113 between upper tie plate 104 and the upper shoulder of fuel elements 102. Tubular channel 101 is held in place by bolts 117, which are inserted through openings provided in corner members 106, which register with threaded extensions 118 of upper tie plate 104. Upper tie plate 104 is also provided with a handle 119 which is used to raise and lower fuel assembly 100 in the reactor core (not shown). From this description it is clear that the reactor subassembly is a compact unit with the fuel elements in close proximity to one another.

While the above described fuel assembly may be used in various types of nuclear reactors, it is particularly suited for use with boiling water moderator-coolant-type nuclear reactors. During operation of a typical boiling water reactor in which the fuel assembly may be employed, the coolant contained in the supply plenum of the reactor flows through lower openings 111, through openings 110 and upward within channel 101 where it surrounds and flow longitudinally along the exterior surface of fuel elements 102. As the coolant flows upward it removes heat from the fuel elements and therefore increases in temperature and finally converts to wet steam, having a quality of 10%, for example. This wet steam then flows through opening 114 and in upper tie plate 104 which discharges into a discharge plenum within the reactor. The discharge plenum receives the steam from a plurality of fuel assemblies which make up the reactor core. Wet steam from the discharge plenum is then dried and transmitted to a steam consuming device such as a turbine. The condensed steam from the steam consuming device may then be returned to the above-mentioned supply plenum.

This turbulent coolant flow about the fuel elements places large stresses on the fuel element cladding which can result in cracks and leakage through the cladding. The problem is aggravated by the high temperature and pressures also placed upon the fuel element cladding. As seen in FIG. II fuel element 207 contains nuclear fuel material 209 within cladding 208. Typical fuel material would include $U^{233}$, $U^{235}$, $Pu^{239}$, or $Pu^{241}$. This material may be in elemental or compound form. Upon absorption of a neutron by the nucleus of such a fissionable atom, a nuclear disintegration frequently results. This produces on the average two fission product atoms of lower atomic weight and of great kinetic energy. Also released in such a disintegration are several neutrons of high energy. For example, in the fission of $U^{235}$ atoms, light fission product atoms of mass number ranging between 80 and 110 and heavy fission product atoms of mass number ranging between 125 and 155. The total energy released approaches 200 mev. (million electron volts) per fission. The kinetic energy of the fission products as well as that of the fission neutrons produced, is quickly dissipated, producing heat in the fuel elements of the reactor. This can result in temperatures within the fuel elements of about 1200° to 2000° F. Along with the fission products produced are gases such as Xe, Kr, neon, and others, as well as off-gases from the cladding and fuel pellets such as oxygen, nitrogen, helium, and others. These gases are accumulated in the plenum chamber 211 as they escape from the fuel pellets and cladding by passing through passages, such as passageway 213. As more gases are released the internal gas pressure may reach 2500 p.s.i.g. or higher. In some fuel elements it is even desirable to vent some of the gas from the fuel element in order to prevent fuel element rupture due to the very high pressure.

From the above discussion it is easy to imagine how the cladding could develop leaks and eventually rupture from either the large temperature stresses, the mechanical stresses due to the coolant flow or the internal gas pressure stresses on the cladding. In order to detect these leaks and prevent cladding rupture the upper end cap 201 has, according to this invention, been modified to provide for apparatus capable of detecting changes in the internal pressure caused by leaks in cladding 208 even after being subjected to the severe environment in the reactor core. As seen in FIGS. III-A and III-B the upper end cap 201 comprises a guide section 204 that extends through the upper tie plate (not shown) and a shoulder section 203 that fits within fuel element 207 and is attached, generally by welding as shown at 206, to the upper portion of cladding 208 thereby forming a seal. Both the guide section 204 and the shoulder section are hollowed to form cavity 220. This cavity is sealed off from the plenum chamber 211 by a flexible diaphragm 202, as shown in FIG. III-A, which is attached to the cavity wall 203A of shoulder section 203. In an alternate design, as shown in FIG. III-B, cavity 220 can also be sealed off by a bellows assembly 202' which is attached to cavity wall 203A of shoulder section 203.

Diaphragm 202 is designed so that as pressure builds in plenum chamber 211 and impinges on diaphragm surface 202A the opposite diaphragm surface 202B will be flexed into cavity 220. Likewise, bellows 202' is designed so as to expand when pressure builds up in plenum chamber 211 and impinges on bellows surface 202A'. As this occurs, surface 202B' is forced up into cavity 220. The bellows arrangement has an advantage of being more easily designed to allow for greater displacement up into cavity 220.

While the diaphragm can be an infinite variety of shapes and constructed from various materials, one such shape found to give satisfactory results is that of a circular stainless steel disc having a thickness of about 2 mils and concavely bowed in the center of the disc as seen in FIG. III-A.

In contact with diaphragm surface 202B or bellows surface 202B' is projection 205 which is displaced in amount proportional to the degree of diaphragm flexing or bellows expansion. According to this invention projection 205 could be attached to surface 202B, or 202B', or held in the desired position by guide section 204 of upper end cap 201. In this latter, and preferred design, guide section 204 is designed so as to fit on shoulder 203 and in conjunction with chamber 220 so as to receive projection 205 as seen in FIG. III-A or III-B. The inner guide section surface 204A normally is positioned in the near proximity of projection 205 to prevent it from tipping over or moving laterally, but not near enough so as to impede or give resistance to the displacement of projection 205 when surface 202B flexes. In one design the inside diameter of the hollow chamber formed by surface 204A is 3/16" and the projection 205 is 1/8" in diameter. Thus, a clearance of 1/32" between projection 205 while maintaining good guidance on the projection path. Of course, this clearance can vary depending on the shape of the projection 205, amount of displacement, rapidity of the displacement, as well as other variables.

While projection 205 is illustrated in FIGS. III-A and III-B as rod-shaped, it is within the scope of this invention that other shapes, such as conical, could be just as easily used. Further, it is within the scope of this invention for the projection not to be of the same materials throughout. By way of example, the lower part of the projection could be made of one metallic material and the upper part could be a magnet or other material which can effect eddy currents.

Further in accordance with this invention, the response of diaphragm 202 or bellows 202' to the internal gas pressure of fuel element 207 can be proportional, i.e., increased flexing with increased pressure, or it could be a "go, no-go" response; i.e., no flexing until a certain pressure has been reached, and then after that limit has been exceeded, maximum flexing or expansion of the diaphragm or bellows would occur.

The response of the diaphragm or bellows to the internal gas pressure is determined by the degree of displacement of rod 205. In the case of a nuclear reactor fuel element this displacement is measured by the fluctuations in an eddy current field due to the projection displacements as illustrated in FIG. IV. Two coils of wire wrapped around one another to form a body 217 are subjected to A.C. current by lines 219 resulting in the production of an eddy current. This body is positioned about the top of guide section 204. In one embodiment body 217 is tubular and has a hollow center 218 whose inside diameter is larger than the outside diameter of guide section 204. In this manner body 217 is easily centered about rod 205 by positioning body 217 so that part of guide section 204 extends into the hollow center 218.

In practice the control rods are inserted to reduce the power output; i.e., the number of fission reactions in the core. Thus, there are substantially no fission gases being produced. The upper tie plate is then removed from the fuel assembly being inspected, thus exposing the guide section of the upper end cap. The eddy current coils are then placed in position about the guide section and measurements are then taken of the fluctuation in the eddy current. If there are leaks within the fuel elements tested the internal gas pressure should be about 0 p.s.i.g. or at least below 50 p.s.i.g. in current reactor designs depending on how soon after the control rods are inserted that the test is made. Preferably, the test is made 30 or more minutes after the power output has been reduced. On the other hand, if there are no leaks within the fuel element, the internal gas pressure will be substantially higher, the exact amount depending on the type of fuel, fuel arrangement in the reactor core, the period of time the fuel in the fuel element has been in service, as well as, many other factors. However, in this latter case the pressure will be great enough to cause the diaphragm or bellows arrangement to flex or expand causing the rod to be displaced upward into the guide section of the upper end cap. In this upward position the rod will create fluctuations in the eddy current being produced about the top of the guide section. This fluctuation is then measured and can be recorded if desired.

EXAMPLE

The applicability of the method of this invention was tested by varying the pressure within a closed system similar to a nuclear reactor fuel element equipped with an upper end cap as shown in FIG. III-A. The projection resting on the diaphragm was 1/8" diameter stainless steel rod on top of which was attached a small magnet of equal diameter. The upper end cap was designed so that the diaphragm would not flex and displace the rod more than 10 mils when the internal gas pressure was 100 p.s.i.g. In this case the diaphragm was a 2 mil thick stainless steel diaphragm.

The closed system was then pressurized to 100 p.s.i.g. and the fluctuation in the eddy current measured. The pressure in the closed system was then gradually decreased to 0 p.s.i.g. and the change in the fluctuation in the eddy current measured. This process was then repeated three times and the results can be seen in Table I below.

TABLE I.—PRESSURE EFFECTS ON EDDY CURRENT FLUCTUATION

| Fuel element pressure (p.s.i.g.) | 100 | 75 | 50 | 25 | 0 |
|---|---|---|---|---|---|
| Eddy current fluctuation (millivolts) | 86 | 64 | 43 | 22 | 0 |

From these results it is clear that the method of this invention can accurately measure even small changes in pressure within a closed system.

This invention is not limited to the preferred description detailed above, but includes the many obvious deviations in upper end cap design, means of attaching the diaphragm to the fuel element, as well as, methods of measuring the projection displacement.

In one particular alternate embodiment the diaphragm or bellows assembly will be attached to the fuel element at a position to seal the end cap cavity from the portion of the fuel element containing the nuclear fuel.

Having thus described and illustrated the invention, what we claim as new, novel, useful and unobvious, and desire U.S. Letters Patent is:

1. An end cap for a nuclear reactor fuel element which comprises:
   (a) a structural body for attachment to one end of said fuel element and having a cavity open toward said fuel element; and
   (b) means for detecting the presence of leaks in the fuel element consisting essentially of a pressure-sensitive flexible means and a projecting means;
      (1) said flexible means attached to said structural body for sealing said cavity and creating a pressurized region therein separate from the remainder of said fuel element so that at least a part of said flexible means undergoes movement into said sealed cavity as a function of the internal pressure from said fuel element on the side opposite from said sealed cavity exerted against it; and
      (2) said projecting means located within said sealed cavity and contacting said flexible means at a position where said projecting means will be displaced longitudinally within said cavity in proportion to the degree of movement of said flexible means into said cavity, said projecting means being constructed at least in part, of material which can effect eddy currents, whereby pressure is determined by measuring the fluctuations in eddy current caused by the displacement of said projecting means within said sealed cavity.

2. An end cap according to claim 1 wherein said flexible means comprises a diaphragm.

3. An end cap according to claim 2 wherein said diaphragm comprises a thin, metallic disc having a depressed center section which moves into said sealed cavity as a function of internal pressure of said fuel element.

4. An end cap according to claim 3 wherein said projecting means is disposed in contact with said depressed center section.

5. An end cap according to claim 1 wherein said flexible means comprises a bellows assembly.

6. An end cap according to claim 5 wherein said bellows assembly comprises a first rigid section attached to said structural body, a second rigid section, and a flexible, accordion-shaped unitary section connected to said first and second rigid sections.

7. An end cap according to claim 6 wherein said projecting means is disposed in contact with said second rigid section.

8. An end cap according to claim 1 wherein said cavity is shaped to guide said projecting means in its longitudinal displacement within said cavity.

9. An end cap according to claim 8 wherein said cavity includes guide walls and the periphery of said projecting means is disposed in close proximity to said guide walls.

10. An end cap according to claim 1 wherein said projecting means is secured to said flexible means.

11. An end cap according to claim 1 wherein said projecting means is operably supported by said cavity for sliding movement therein.

12. An end cap according to claim 1 wherein said sealed cavity is substantially empty except for the presence of said flexible means and said projecting means.

13. A fuel element for use in a nuclear reactor which comprises:
(a) a long, thin hollow body containing nuclear fuel having an opening at each end;
(b) a first capping means attached to said body and sealing one of said body openings;
(c) a second capping means attached to said body and sealing said other body opening, said second capping means having a cavity adjacent to said other body opening and facing said hollow portion of said body;
(d) means for detecting the presence of leaks in the fuel element consisting essentially of a pressure-sensitive flexible means and a projecting means;
  (1) said flexible means operably associated with said second capping means for sealing said cavity from the hollow body containing said nuclear fuel and creating a pressurized region therein separate from said hollow body so that at least a part of said flexible means undergoes movement into said sealed cavity as a function of internal pressure from within said hollow body exerted against it; and
  (2) said projecting means in contact with said flexible means so that said projecting means will undergo longitudinal sliding movement within said sealed cavity in proportion to the movement of said flexible means into said sealed cavity, said projecting means comprising at least in part of material which can effect eddy currents.

References Cited

UNITED STATES PATENTS

| | | | |
|---|---|---|---|
| 2,855,355 | 10/1958 | Ohlinger et al. | 176—80 |
| 3,350,271 | 10/1967 | Maidment et al. | 176—80 X |

FOREIGN PATENTS

| | | | |
|---|---|---|---|
| 1,100,723 | 1/1968 | Great Britain | 176—19 LD |
| 1,478,420 | 4/1967 | France | 176—19 R |
| 1,541,716 | 10/1968 | France | 176—68 |
| 646,199 | 9/1962 | Italy | 176—80 |

CARL D. QUARFORTH, Primary Examiner

R. S. GAITHER, Assistant Examiner

U.S. Cl. X.R.

176—19 LD, 68, 79